(12) United States Patent
Kitou et al.

(10) Patent No.: US 6,404,459 B1
(45) Date of Patent: Jun. 11, 2002

(54) DISPLAY WITH SCAN CONVERTER FOR CONVERTING SCANNING FREQUENCY OF INPUT VIDEO SIGNAL

(75) Inventors: Kouji Kitou, Hiratsuka; Ikuya Arai; Kunio Umehara, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/247,063

(22) Filed: Feb. 9, 1999

Related U.S. Application Data (63) Continuation of application No. 08/519,100, filed on Aug. 24, 1995, now Pat. No. 5,870,073.

(30) Foreign Application Priority Data

Sep. 2, 1994 (JP) .............................................. 6-209551

(51) Int. Cl.$^7$ .......................... H04N 7/01; H04N 11/20; H04N 5/46
(52) U.S. Cl. ....................... 348/555; 348/458; 345/698; 345/699
(58) Field of Search ................................ 348/458, 459, 348/554–558, 543, 441, 443, 448–452; 345/698, 699; H04N 7/01, 11/20

(56) References Cited

U.S. PATENT DOCUMENTS

| | | | |
|---|---|---|---|
| 5,053,724 A | 10/1991 | Ogino et al. | 331/14 |
| 5,130,800 A | 7/1992 | Johnson et al. | 348/564 |
| 5,155,417 A | 10/1992 | Tateishi | |
| 5,168,359 A | 12/1992 | Mills | 348/458 |
| 5,184,091 A | 2/1993 | Srivastava | 331/10 |
| 5,229,853 A | 7/1993 | Myers | 348/458 |
| 5,301,021 A | 4/1994 | Ogino et al. | 348/564 |
| 5,315,387 A | 5/1994 | Tachibana | |
| 5,331,346 A | 7/1994 | Shields et al. | 348/441 |
| 5,349,385 A | 9/1994 | Glenn | 348/458 |
| 5,359,265 A | 10/1994 | Kii et al. | 315/367 |

FOREIGN PATENT DOCUMENTS

| | | |
|---|---|---|
| DE | 3931946 | 4/1990 |
| DE | 4106990 | 12/1991 |
| DE | 4300834 | 9/1993 |
| JP | 3-73994 | 3/1991 |
| JP | 6-149194 | 5/1994 |

Primary Examiner—Michael H. Lee
(74) Attorney, Agent, or Firm—Antonelli, Terry, Stout & Kraus, LLP (57) ABSTRACT

A display for receiving video signals of a plurality of deflection frequencies including a conversion unit which is responsive to at least one of a horizontal frequency and a vertical frequency of an input video signal below at least one of at least one predetermined horizontal frequency within a first horizontal frequency range and at least one predetermined vertical frequency within a first vertical frequency range for converting the input video signal to have at least one of a converted horizontal frequency within the first horizontal frequency range and a converted vertical frequency within the first vertical frequency range. The conversion unit is further responsive to the at least one of the horizontal frequency and the vertical frequency of the input video signal being within at least one of the first horizontal frequency range and the first vertical frequency range for directly supplying the input video signal to the output of the conversion unit. The display is capable of displaying pictures represented by video signals from computers or image generating apparatus.

36 Claims, 9 Drawing Sheets

DISPLAY WITH SCAN CONVERTER FOR CONVERTING SCANNING FREQUENCY OF INPUT VIDEO SIGNAL

CROSS-REFERENCES TO RELATED APPLICATIONS

This application is a continuation of application Ser. No. 08/519,100 filed on Aug. 24, 1995, now U.S. Pat. No. 5,870,073.

This application is also related to application Ser. No. 08/306,711 filed on Sep. 15, 1994, now U.S. Pat. No. 5,712,532; application Ser. No. 08/381,491 filed on Jan. 31, 1995, now U.S. Pat. No. 5,812,210; and application Ser. No. 09/109,179 filed on Jul. 2, 1998, which is a continuation of application Ser. No. 08/306,711.

FIELD OF THE INVENTION

The present invention relates to a display for terminal equipment of a computer system or the like and, more specifically, to a display capable of displaying pictures represented by video signals from computers or image generating apparatus.

BACKGROUND OF THE INVENTION

A display included in a terminal equipment of a computer system receives video signals of various systems because different computers are different from each other, for example, in video signal scanning frequency, image displaying interval, displaying position and blanking interval, etc. Accordingly, a display capable of properly displaying images represented by video signals of different systems, i.e., what is called a multiscan display, has been used in recent years.

A display of such a type varies horizontal oscillation frequency according to the result of voltage conversion of the frequency of a synchronizing signal included in video signals provided to the display by a synchronizing oscillator, as disclosed in Japanese Patent Publication No. 61-8628, originally published as Japanese Patent Application Laid-Open No. 53-57914, so as to deal with video signals of different scanning frequencies.

Another display of such a type shifts the phase of a synchronizing signal included in video signals by a position correcting circuit using a monostable multivibrator as disclosed in Japanese Patent Application Laid-open No. 61-100078 so as to adjust the position of the image on the screen of the display according to image display position. There are many known techniques concerning multiscan displays.

The above-mentioned prior art employs a deflecting circuit comprising many active elements to deal with video signals of different systems and uses a circuit of a large scale to secure operating stability and reliability, causing problems in ease of manufacture and in adjustment of display. Recently, the scanning frequency of the video signals has been increased and hence the number of systems of video signals to be dealt with by the display has increased. As regards the scanning frequency of video signals, a display is required to be capable of dealing with video signals having horizontal scanning frequencies in the range of 15.75 kHz for NTSC video signals to about 100 kHz for high-definition video signals, and video signals used in CAD systems and CAM systems. A complex element constant switching control circuit is necessary to improve the prior art display so as to meet such a requirement, and a large-scale circuit is necessary to secure operating reliability. Furthermore, it is difficult to secure satisfactory performance to prevent the deterioration of picture quality and distortion of pictures for video signals of different systems, and the cost of the display increases to secure satisfactory performance.

SUMMARY OF THE INVENTION

Accordingly, it is an object of the present invention to provide a display capable of dealing with video signals of different systems and having improved performance, reliability and stability at a reduced cost.

The present invention provides a display including a frequency/resolution converting unit for converting the scanning frequency and the resolution of video signals, and a multiscan display unit or a single scan display unit having an operating frequency range narrower than that of the prior art display.

The frequency/resolution converting unit raises the horizontal or vertical scanning frequency of video signals applied to the display, and the multiscan display unit or the single-scan display unit displays images represented by video signals of a scanning frequency in a predetermined frequency range provided by the frequency/resolution converting unit correctly at a predetermined position on the screen.

DESCRIPTION OF THE PREFERRED EMBODIMENTS

Figure 1:
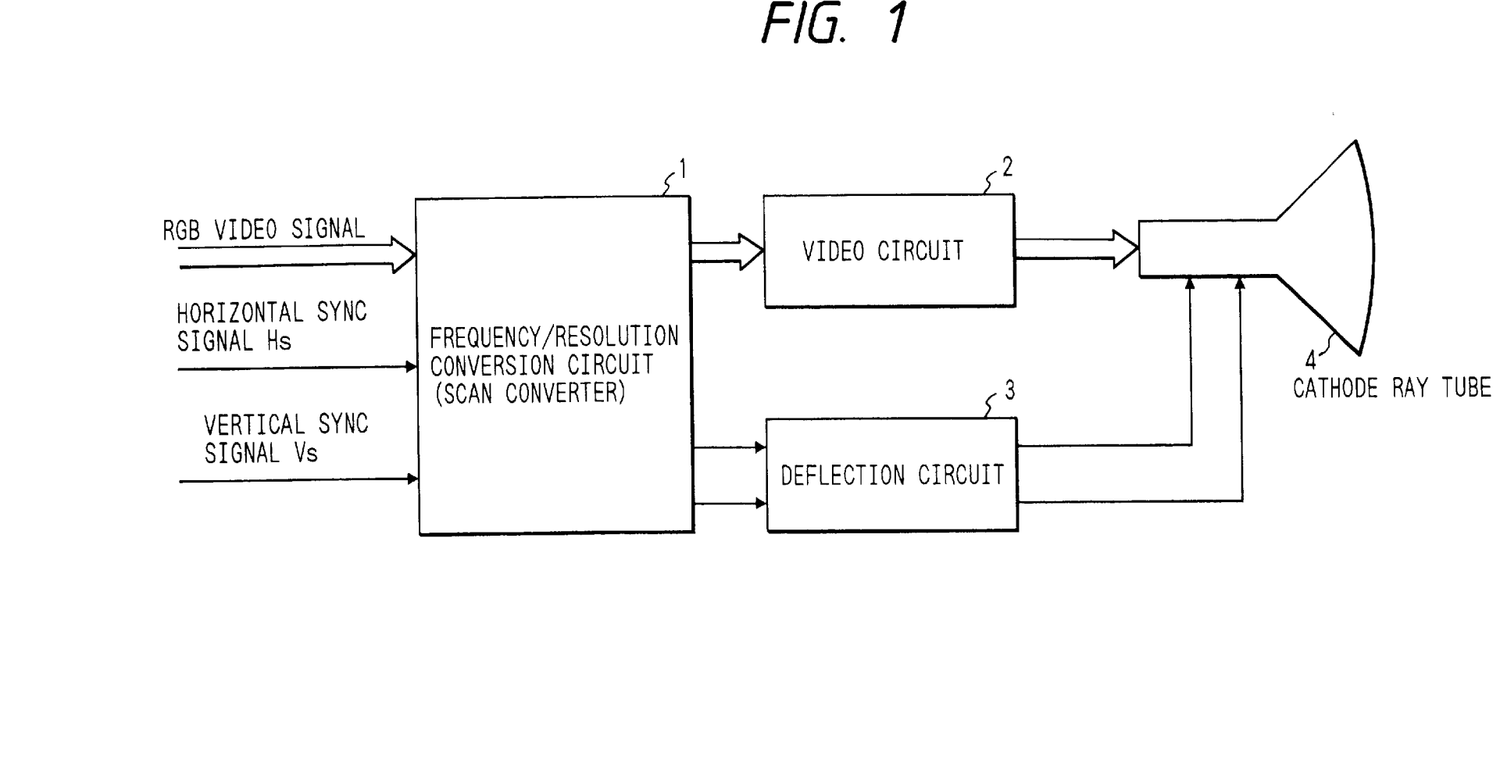
FIG. 1 is a block diagram of a display in a first embodiment according to the present invention.

Referring now to the drawings wherein like reference numerals are utilized to designate like parts, FIG. 1 is a block diagram of a display according to an embodiment of the present invention. As shown, there are provided a frequency/resolution converting circuit (hereinafter referred to as "scan converter") 1 for converting the frequency or the resolution of video signals applied to the display, a video circuit 2, a deflecting circuit 3 and a CRT 4. In the display shown in FIG. 1, the video circuit 2, the deflecting circuit 3 and the CRT 4 constitute a multiscan display unit capable of dealing with a narrow deflection frequency range. While the conventional multiscan display operates, for example, in a wide horizontal deflection frequency range, which corresponds to the scanning range of video signals applied to the display, of about 30 kHz to about 100 kHz, the multiscan display unit of the present invention operates, for example, in a narrow horizontal deflection frequency range of about 50 kHz to about 100 kHz, in which the lower limit horizontal deflection frequency is about half the upper limit horizontal deflection frequency. The scan converter 1 converts the horizontal scanning frequency of the input video signal into a horizontal scanning frequency suitable for the deflecting circuit 3, and converts the vertical scanning frequency of the video signal into a vertical scanning frequency equal to or twice or four times the vertical scanning frequency of the input video signal which is in the range of 60–70 Hz, for example. Therefore, video signals having a deflection frequency lower than the lower limit of the deflection frequency range in which the deflecting circuit 3 operates can be displayed on the CRT 4.

Figure 2:
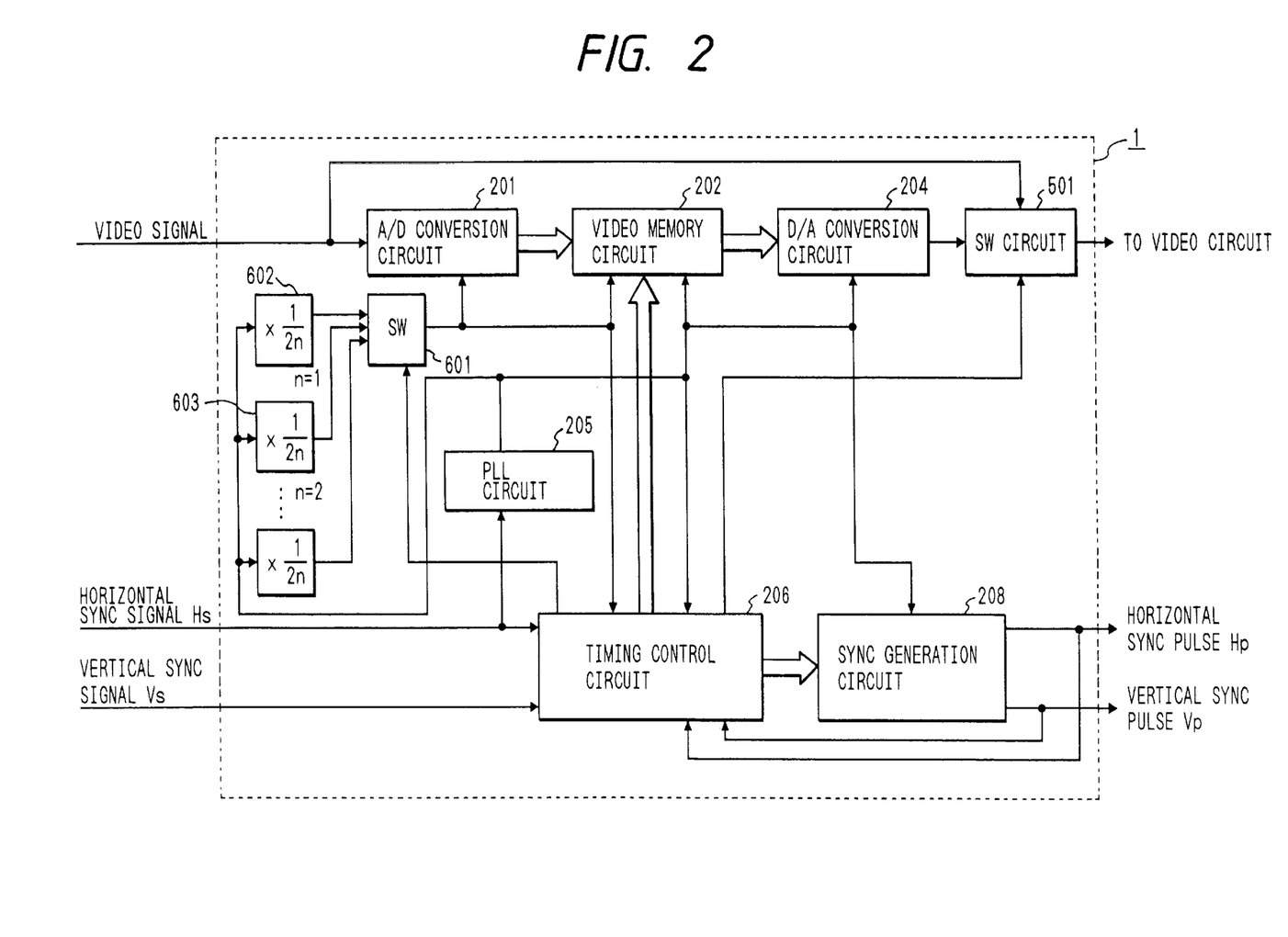
FIG. 2 is a block diagram of a frequency/resolution converting circuit included in the display of FIG. 1.

FIG. 2 is a block diagram of the scan converter 1 of FIG. 1 and includes an analog-to-digital converter (A/D converter) 201, a video memory such as a frame memory 202, a digital-to-analog converter (D/A converter) 204, a PLL circuit 205, a timing controller 206, a synchronizing signal generator 208, switches 501 and 601, a $\frac{1}{2}^n$ frequency demultiplier or divider 602, wherein n=1 and respective $\frac{1}{2}^n$ frequency demultipliers or dividers 603, where n=2 or more. In FIG. 2, only one of the three channels, i.e., an R-, a G- and a B-channel, is shown. The scan converter 1 is provided with three sets each of the A/D converter 201, the frame memory 202, the D/A converter 204 and the switch 501 when RGB color video signals are applied to the display of FIG. 1.

Figure 3:
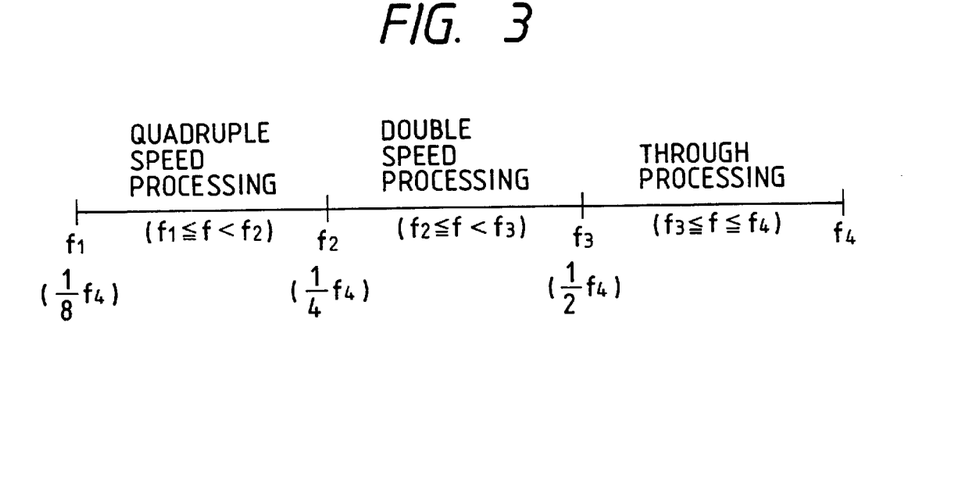
FIG. 3 is a diagram for explaining the operation of the frequency/resolution converting circuit of FIG. 2.

The operation of the scan converter 1 of FIG. 2 is described with reference to FIG. 3 wherein it is assumed that the horizontal deflection frequencies of input signals supplied to the scan converter 1 are in the range of a minimum frequency f1 (=f4/8) to a maximum frequency f4. Input signals of horizontal deflection frequencies in the range of f3 (=f4/2) to f4 are subjected to through processing, in which the input signals are not processed. Input signals of horizontal deflection frequencies in the range of not lower than f2 (=f4/4) to lower than f3 are subjected to a double speed processing to double the horizontal deflection frequencies of the input signals. Input signals of horizontal deflection frequencies in the range of not lower than f1 (=f4/8) to lower than f2 are subjected to a quadruple speed processing to multiply the horizontal deflection frequencies of the input signals by four. Consequently, the resultant horizontal deflection frequencies of the output signals of the scan converter 1 are in the range of f3 to f4, and the multiscan display unit operating in a narrow horizontal deflection frequency range is able to deal with those output signals. Thus, a display having high ability and reliability and capable of stable operation can be fabricated at a reduced cost.

Figure 4:
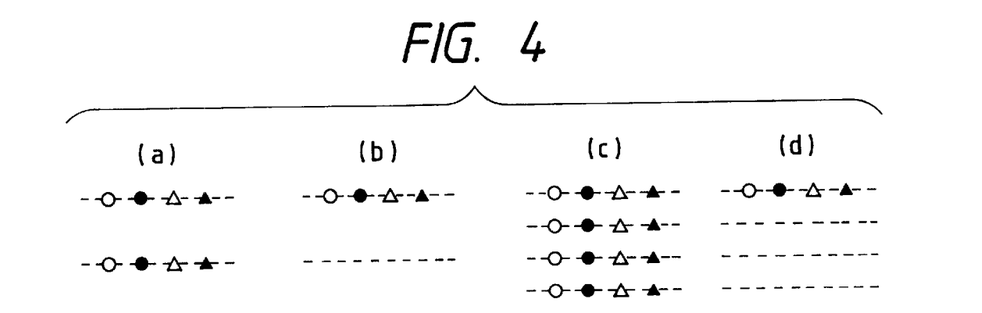
FIG. 4 is a diagram for explaining the operation of the frequency/resolution converting circuit of FIG. 2.

The operation of the scan converter 1 of FIG. 2 is further described with reference to FIG. 4. An input video signal supplied to the A/D converter 201 is converted into a corresponding digital signal by synchronous sampling with a sampling clock signal supplied to the A/D converter through the PLL circuit 205, the frequency demultipliers 602 or 603, and the switch 601. The switch 601 supplies the output of the frequency demultiplier 603 having n=2 to the A/D converter 201 when the horizontal deflection frequency of the input signal is in the range of f1 to lower than f2, and supplies the output of the frequency demultiplier 602 having n=1 to the A/D converter 201 when the horizontal deflection frequency of the input signal is in the range of f2 to lower than f3. The PLL circuit 205, i.e., a phase-locked loop circuit, generates a clock signal of a frequency N times (N is a positive integer) the frequency of a horizontal synchronizing signal Hs supplied to the scan converter 1 in phase with the horizontal synchronizing signal Hs. Generally, each set of data supplied from the A/D converter 201 to the frame memory 202 is 8-bit data, which is equal to the resolution of the A/D converter 201. The data stored in the frame memory 202 are read in phase with the clock signal generated by the PLL circuit 205. The synchronizing signal generator 208 is controlled by the timing controller 206 so as to generate an output horizontal synchronizing pulse signal Hp and an output vertical synchronizing pulse signal Vp, using the clock signal generated by the PLL circuit 205. The frequency of the output horizontal synchronizing pulse signal Hp is equal to or twice or four times that of the input horizontal synchronizing signal Hs. The frequency of the output vertical synchronizing pulse signal Vp is equal to or twice or four times that of the input vertical synchronizing signal Vs. When the horizontal deflection frequency is converted into a frequency twice or four times greater, when the vertical deflection frequency is converted into twice or four times that of the input horizontal synchronizing signal Hs, the number of scanning lines does not change and hence a scanning line supplement is unnecessary. Since the number of scanning lines is doubled or quadrupled when the output vertical deflection frequency is equal to the input vertical deflection frequency, a scanning line supplement is necessary. In FIG. 4, (a) and (b) show a scanning line supplement to be performed when the number of scanning lines is doubled. In (a) in FIG. 4, the same information is supplied to two scanning lines. In (b) in FIG. 4, a black level signal is supplied to an additional scanning line. In FIG. 4, (c) and (d) show a scanning line supplement to be performed when the number of scanning lines is quadrupled. In FIG. 4 the same information is supplied to four scanning lines. In (d) in FIG. 4, a black level signal is supplied to three additional scanning lines.

The output of the D/A converter 204 is supplied through the switch 501. The timing controller 206 controls the switch 501 to provide either the input signal or the signal which has undergone double speed processing or quadruple speed processing. Thus, the scan converter 1 converts input video signals supplied to the display of FIG. 1 to enable the display to function as a wide-band multiscan display.

Figure 5:
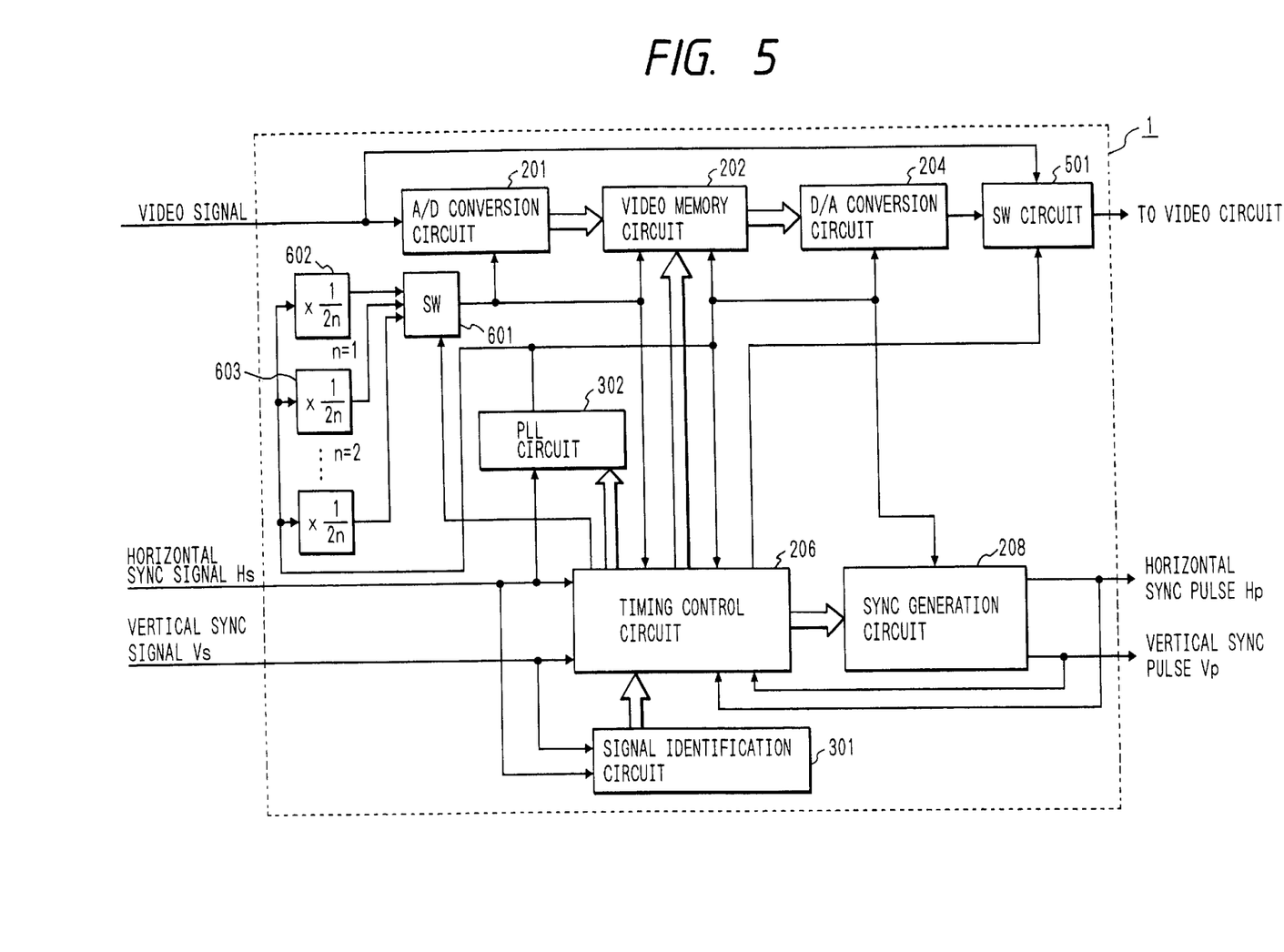
FIG. 5 is a block diagram of a modified frequency/resolution converting circuit for use in the display of FIG. 1.

FIG. 5 is a block diagram of a scan converter 1, which is a modification of the scan converter 1 included in the display shown in FIG. 1 and includes a signal identifying circuit 301. Referring to FIG. 5, the timing system and the resolution of the input video signal are determined from the horizontal synchronizing signal Hs and the vertical synchronizing signal Vs applied to the scan converter 1, and the scanning frequency of the video signal is raised. For example, when the input video signal is a VGA signal used in a personal computer, and its display resolution is 640×480 (640 dots along the horizontal scanning direction and 480 lines along the vertical scanning direction), the signal identifying circuit 301 determines the respective frequencies and polarities of the horizontal synchronizing signal Hs and the vertical synchronizing signal Vs to identify the resolution and the type of the video signal. The timing controller 206 specifies the oscillation frequency of the PLL circuit 302 on the basis of the result of this identification. In this example, since the horizontal scanning frequency is 31.5 kHz and the number of dots in one horizontal scanning interval is 800, the frequency of a clock to be generated by the PLL circuit 302 is 31.5 kHz×800×2=50.4 MHz. The A/D converter 201 samples the video signal in phase with a clock of a frequency half that of the clock generated by the PLL circuit 302 and writes the sampled video data in the frame memory 202. The write timing is controlled by the timing controller 206. The timing of reading the video data from the frame memory 202 is controlled by the timing controller 206. Thus, the display of the present invention is capable of accurately dealing with video signals of scanning frequencies in a frequency range lower than a frequency range with which the deflection circuit 3 is able to deal and of dealing with various video signals without deteriorating the reliability and the adjusting time of the deflection system.

Figure 6:
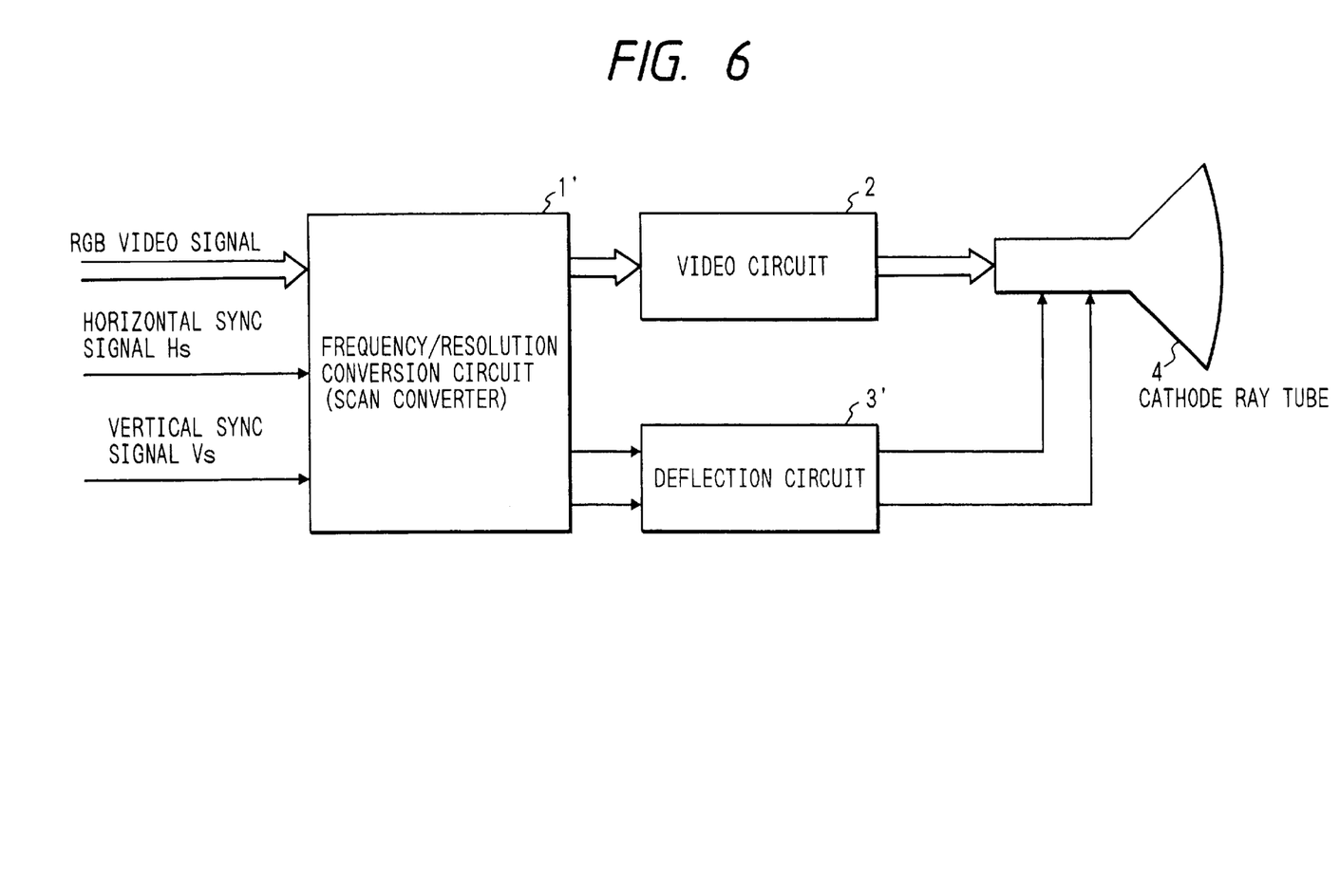
FIG. 6 is a block diagram of a display in a second embodiment according to the present invention.

FIG. 6 shows a display in another embodiment according to the present invention including a frequency/resolution converting circuit 1' (hereinafter referred to as "scan converter") and at a deflection circuit 3'. The deflecting circuit 3' of FIG. 6 has a single-scan-oriented horizontal deflecting circuit capable of dealing with substantially a single frequency, and a multiscan-oriented vertical deflecting circuit.

Figure 7:
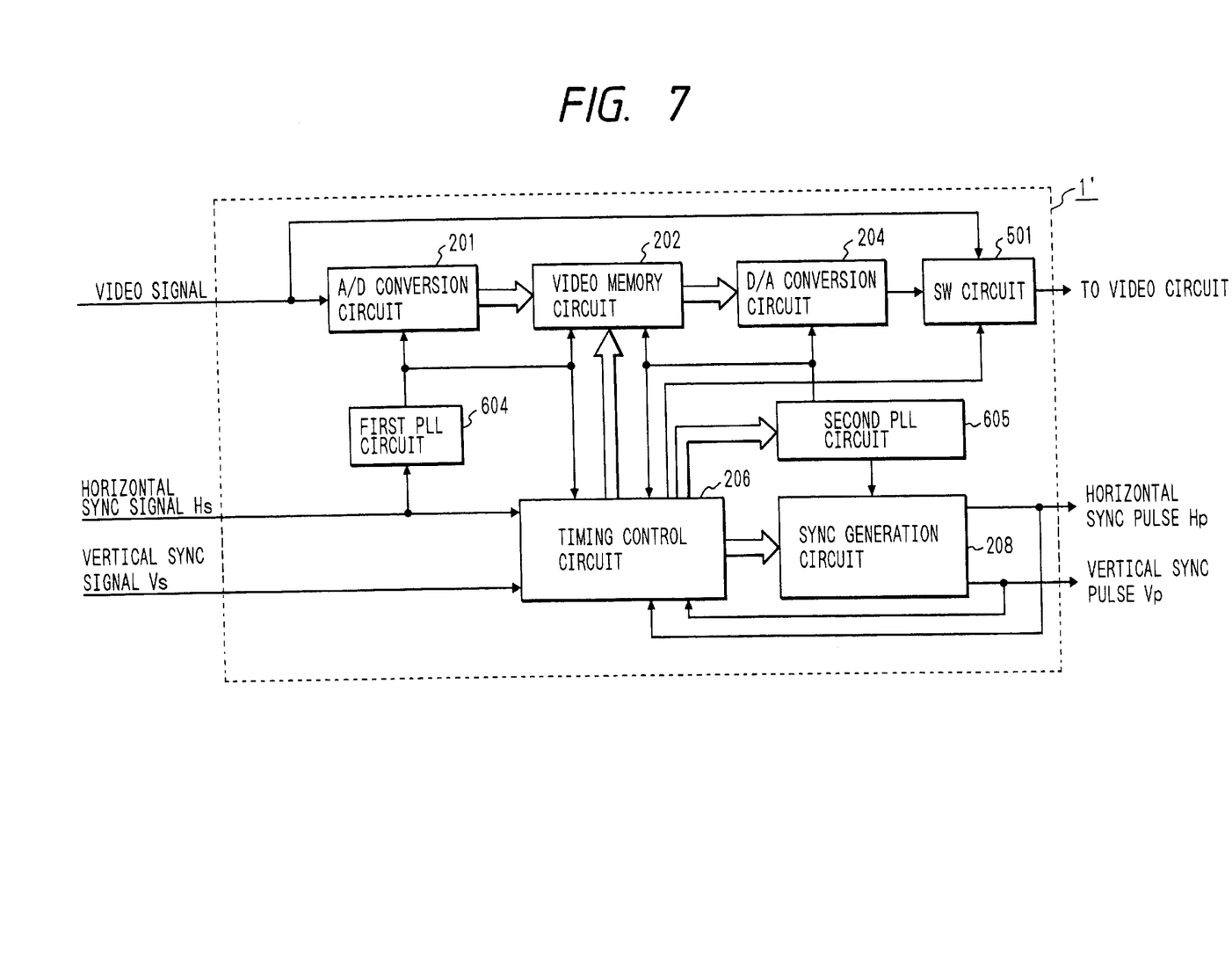
FIG. 7 is a block diagram of a frequency/resolution converting circuit included in the display of FIG. 6.

FIG. 7 is a block diagram of the scan converter 1' which includes PLL circuits 604 and 605. The operation of the scan converter 1' is described with reference to FIG. 8 wherein it is assumed that the horizontal deflection frequencies of input signals supplied to the scan converter 1' are in a frequency range of a minimum frequency f1 to a maximum frequency f4. Then, input signals of horizontal deflection frequencies in the range of f1 to lower than f4 are converted to output signals of horizontal deflection frequency f4 by raising the vertical deflection frequency. When the input horizontal deflection frequency is fH and the input vertical deflection frequency is fV, the output vertical deflection frequency is fV'=fV×f4/fH. Input signals of input horizontal deflection frequencies equal to f4 are subjected to a through processing, in which the input signals are not processed.

Figure 8:
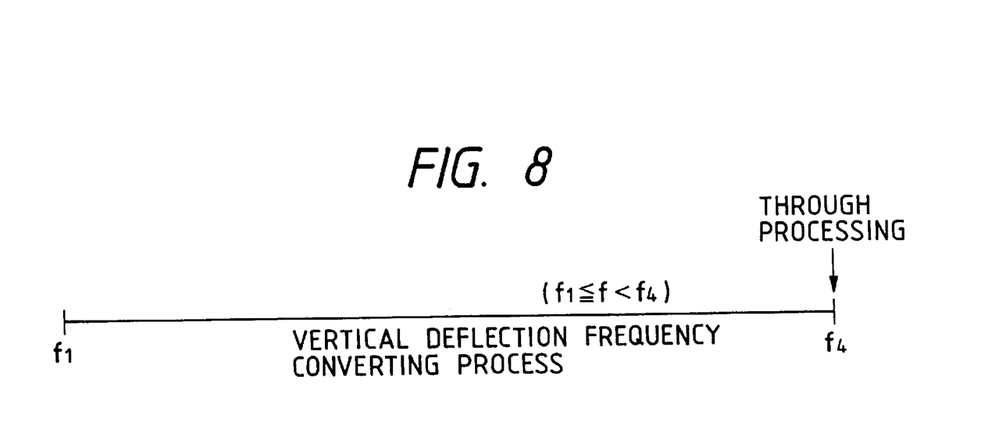
FIG. 8 is a diagram for explaining the operation of the frequency/resolution converting circuit of FIG. 7.

A video signal supplied to the A/D converter 201 of FIG. 7 is sampled in phase with a sampling clock provided by the PLL circuit 604 to convert the video signal into digital video data. The PLL circuit 604, i.e., a phase-locked loop circuit, generates a clock signal of a frequency N times (N is a positive integer) the frequency of the horizontal synchronizing signal Hs in phase with the horizontal synchronizing signal Hs given to the scan converter 1. Generally, each set of data given from the A/D converter 201 to the frame memory 202 is 8-bit data, which is equal to the resolution of the A/D converter 201. The sets of data stored in the frame memory 202 are read in phase with a clock signal generated by the PLL circuit 605. The synchronizing signal generator 208 generates, under the control of the timing controller 206, an output horizontal synchronizing pulse signal Hp and a vertical synchronizing pulse signal Vp, using the clock signal generated by the PLL circuit 605. As shown in FIG. 8, the frequency of the horizontal synchronizing pulse signal Hp remains substantially constant regardless of the input horizontal synchronizing signal Hs. The frequency of the vertical synchronizing pulse signal Vp is equal to or higher than that of the input vertical synchronizing signal Vs.

The output of the D/A converter 204 is provided through the switch 501. The switch 501 selects either the input signal or the signal which has undergone frequency conversion according to a control signal provided by the timing controller 206. Thus, the scan converter 1' converts video signals supplied to the display of FIG. 6 to enable the display to function as a wide-band multiscan display.

Figure 9:
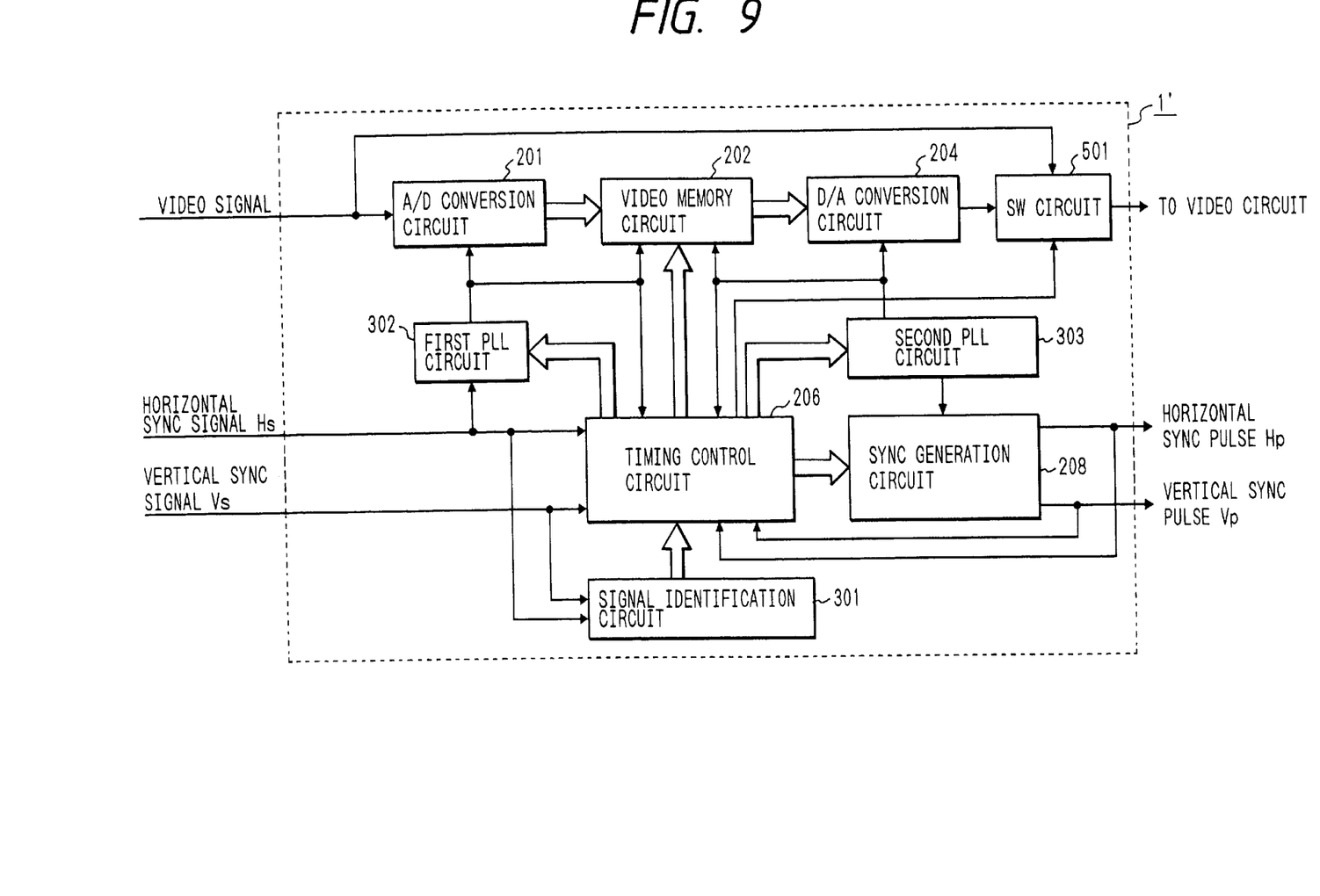
FIG. 9 is a block diagram of a modified frequency/resolution converting circuit for use in the display of FIG. 6.

FIG. 9 is a block diagram of a modification of the scan converter 1' of FIG. 7 and similarly to that of FIG. 5, is provided with a signal identifying circuit 301, which determines the timing system and the resolution of an input video signal from the horizontal synchronizing signal Hs and the vertical synchronizing signal Vs and provides control data to the timing controller 206 to achieve accurate frequency conversion and resolution conversion.

Figure 10:
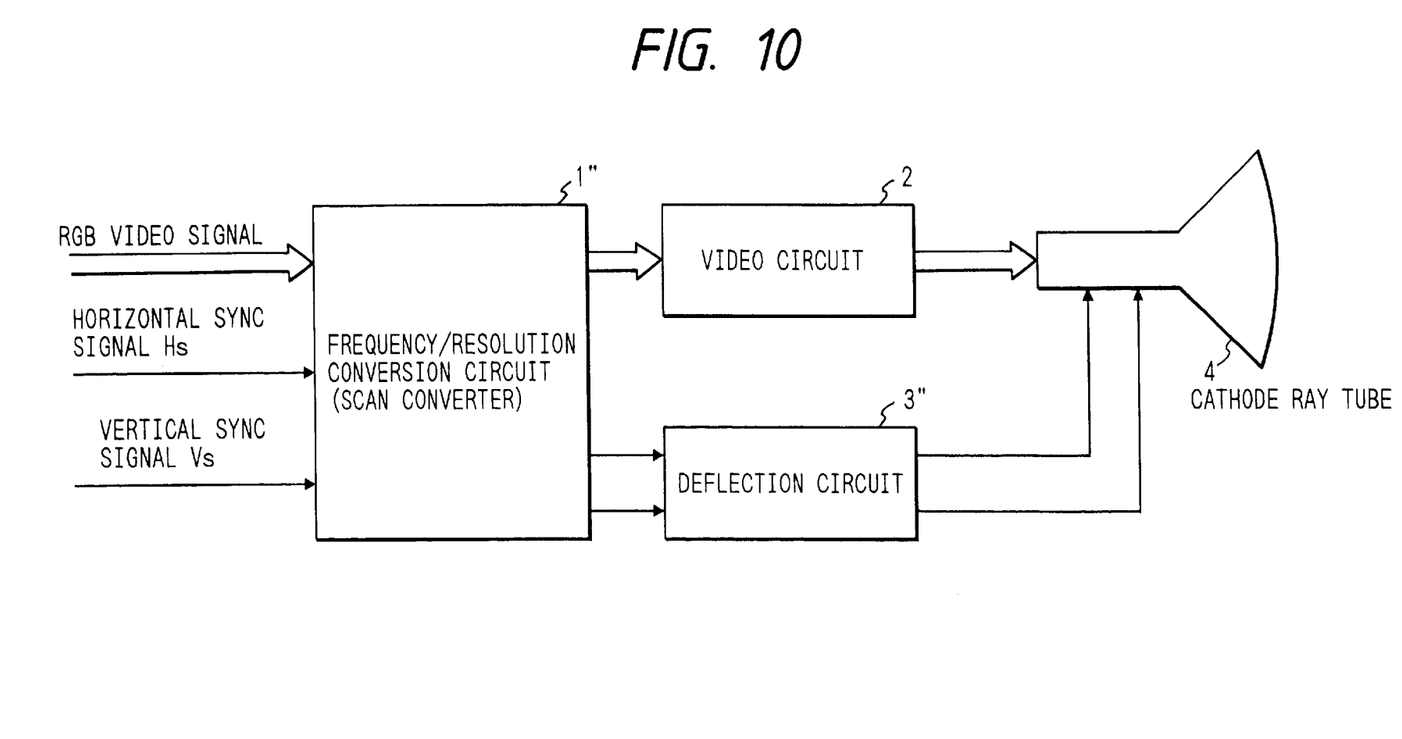
FIG. 10 is a block diagram of a display in a third embodiment according to the present invention.

FIG. 10 is a block diagram of a display according to another embodiment of the present invention, having a frequency/resolution converting circuit 1" (hereinafter referred to as "scan converter") and a deflecting circuit 3". The deflecting circuit 3" of FIG. 10 has a single-scan-oriented horizontal deflecting circuit and a single-scan-oriented vertical deflecting circuit, which are capable of dealing with substantially a single frequency.

Figure 11:
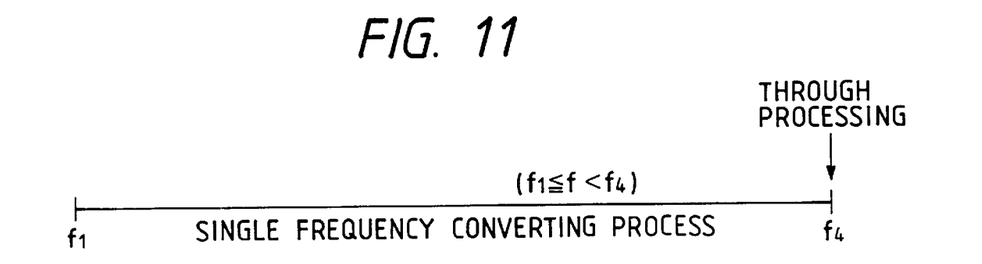
FIG. 11 is a diagram for explaining the operation of the frequency/resolution converting circuit of FIG. 10.
Figure 12:
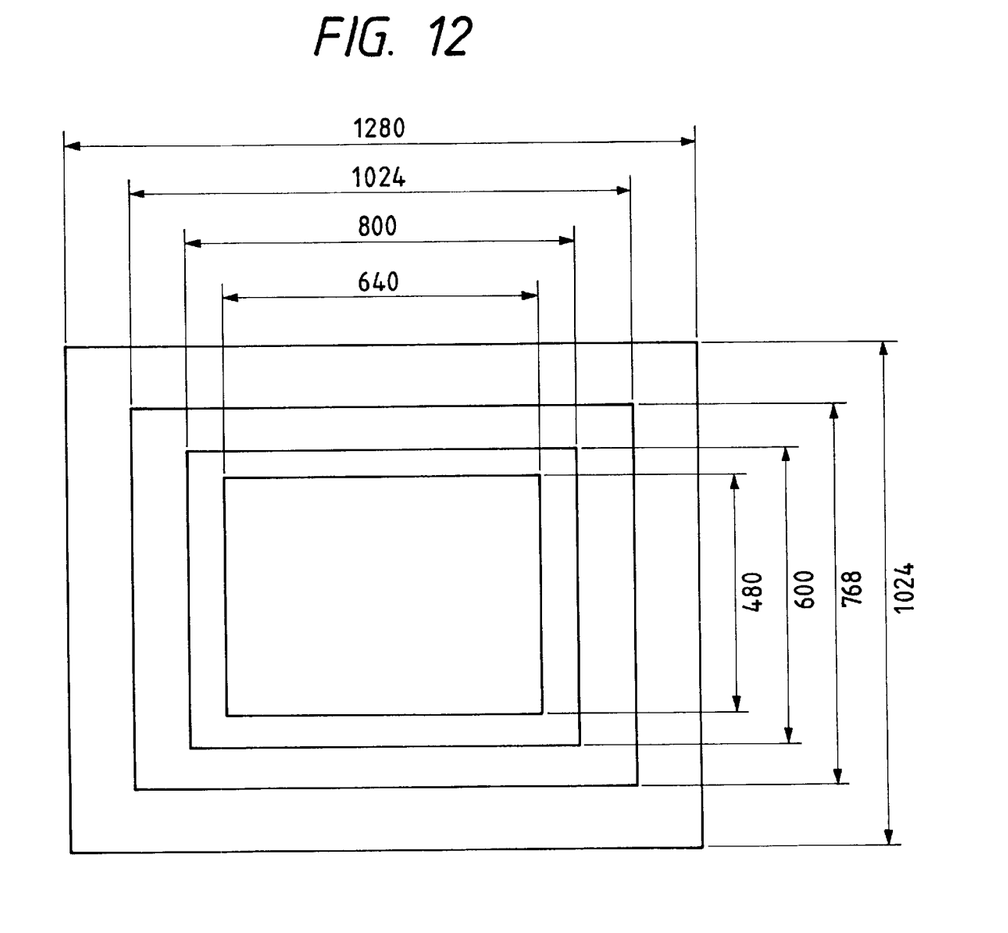
FIG. 12 shows a front view of the screen of the display of FIG. 10.

Although the configuration of the scan converter 1" is the same as those shown in FIGS. 1 and 6, the mode of operation of the scan converter 1" is different from those shown in FIGS. 1 and 6. The operation of the scan converter 1" is described with reference to FIGS. 11 and 12. Assuming that the horizontal deflection frequencies of input signals supplied to the scan converter 1" are in the range of a minimum frequency f1 to a maximum frequency f4, input signals of frequencies in the range of f1 to less than f4 are subjected to a frequency converting process that converts the horizontal deflection frequencies of the input signal into the horizontal deflection frequency f4. At the same time, the scan converter 1" converts the vertical deflection frequencies into substantially a single vertical deflection frequency fV, such as a frequency of 70 Hz which makes flicker inconspicuous as shown in FIG. 11. When the input horizontal deflection frequency is f4 and the input vertical deflection frequency is fV, the input signal is subjected to through processing, in which the input signal is not processed. Consequently, the display is able to function as a wide-band multiscan display even though the display unit comprising the video circuit 2 and the deflecting circuit 3" is of a single-scan type capable of dealing with a substantially single frequency. since the number of display dots of this display, for example, 1280× 1024 dots, is fixed, an image represented by a signal having a number of dots smaller than that fixed number of dots is displayed in part of the screen as shown in FIG. 12 which is a front view of the screen of the display.

As is apparent from the foregoing description, the display in accordance with the present invention includes the frequency/resolution converting circuit of a simple configuration, and the display unit capable of dealing with a predetermined video signal system, and is capable of displaying pictures represented by various video signals other than those for which the display unit is designed, without deteriorating picture quality and without requiring complex image processing operations. Thus, the display is capable of dealing with video signals of a variety of signal systems. Since the display of the present invention processes digital video data to deal with video signals of a variety of signal systems, loss in the deflecting circuit of the display is reduced, optimum design of the display is readily feasible and the adjustment of the display when assembling the same is facilitated. Accordingly, the display can be fabricated at a reduced cost.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A display for receiving video signals of a plurality of deflection frequencies, the display comprising a conversion unit, the conversion unit including:
    a conversion circuit responsive to at least one of a horizontal frequency and a vertical frequency of an input video signal being below at least one of at least one predetermined horizontal frequency within a first horizontal frequency range and at least one predetermined vertical frequency within a first vertical frequency range which converts the input video signal to have at least one of a converted horizontal frequency within the first horizontal frequency range and a converted vertical frequency within the first vertical frequency range; and
    a supply circuit responsive to the at least one of the horizontal frequency and the vertical frequency of the input video signal being within at least one of the first horizontal frequency range and the first vertical frequency range which directly supplies the input video signal to the output of the conversion unit.

2. A display according to claim 1, wherein the at least one of the horizontal frequency and the vertical frequency of the input video signal is within at least one second horizontal frequency range below the first horizontal frequency range and at least one second vertical frequency range below the first vertical frequency range and
    wherein the conversion unit includes a frequency increasing circuit which increases the at least one of the horizontal frequency and the vertical frequency of the input video signal to within at least one of the first horizontal frequency range and the first vertical frequency range by multiplying the at least one of the horizontal frequency and the vertical frequency by $2^n$, where n is a positive integer of at least 1.

3. A display according to claim 2, wherein the at least one of the second horizontal frequency range and the second vertical frequency range include two frequency ranges; and
    wherein the at least one of the horizontal frequency and the vertical frequency of the input video signal is multiplied by 2 when it is within one of the two frequency ranges, and is multiplied by 4 when it is within the other of the two frequency ranges.

4. A display according to claim 1, wherein the conversion unit includes a frequency increasing circuit which increases the at least one horizontal frequency of the input video signal to one predetermined horizontal frequency within the first horizontal frequency range.

5. A display according to claim 4, wherein the conversion unit includes a frequency increasing circuit which increases the at least one vertical frequency of the input video signal to one predetermined vertical frequency within the first vertical frequency range.

6. A display according to claim 2, wherein the conversion unit includes:
    an A/D conversion circuit which converts the input video signals into digital signals and outputs the digital signals;
    a video memory circuit which stores the output digital signals of the A/D conversion circuit for each vertical scanning interval;
    a D/A conversion circuit responsive to the video memory circuit which converts the digital signals stored by the video memory circuit into analog signals and outputs the analog signals;
    a video signal switching circuit which selectively outputs the output analog signals of the D/A conversion circuit and the input video signals;
    a PLL circuit which provides a clock signal synchronous with a horizontal synchronizing signal for the input video signal to the D/A conversion circuit;
    a clock signal generating circuit which provides a clock signal obtained by dividing the clock signal provided by the PLL circuit to the A/D conversion circuit;
    a synchronizing signal generating circuit which provides horizontal and vertical synchronizing pulses to a deflecting circuit included in the display in phase with the clock signal provided by the PLL circuit; and
    a timing control circuit which controls the conversion unit.

7. A display according to claim 6, wherein the conversion unit further includes a signal identifying circuit which provides identification information for identifying the input video signals to the timing control circuit.

8. A display according to claim 3, wherein the conversion unit includes:
    an A/D conversion circuit which converts the input video signals into digital signals and outputs the digital signals;
    a video memory circuit which stores the output digital signals of the A/D conversion circuit for each vertical scanning interval;
    a D/A conversion circuit responsive to the video memory circuit which converts the digital signals stored by the video memory circuit into analog signals and outputs the analog signals;
    a video signal switching circuit which selectively outputs the output analog signals of the D/A conversion circuit and the input video signals;
    a first PLL circuit which provides a first clock signal synchronous with a horizontal synchronizing signal for the input video signals to the A/D conversion circuit;
    a second PLL circuit which provides a second clock signal to the D/A conversion circuit;
    a synchronizing signal generating circuit which provides horizontal and vertical synchronizing pulses to a deflecting circuit included in the display in phase with the second clock signal provided by the second PLL circuit; and
    a timing control circuit which controls the conversion unit.

9. A display according to claim 8, wherein the conversion unit further includes a signal identifying circuit which provides identification information identifying the input video signals to the timing control circuit.

10. A display according to claim 4, wherein the conversion unit includes:
    an A/D conversion circuit which converts the input video signals into digital signals and outputs the digital signals;
    a video memory circuit which stores the output digital signals of the A/D conversion circuit for each vertical scanning interval;
    a D/A conversion circuit responsive to the video memory circuit which converts the digital signals stored by the video memory circuit into analog signals and outputs the analog signals;
    a video signal switching circuit which selectively outputs the output analog signals of the D/A conversion circuit and the input video signals;

a first PLL circuit which provides a first clock signal synchronous with a horizontal synchronizing signal for the input video signals to the A/D conversion circuit;

a second PLL circuit which provides a second clock signal to the D/A conversion circuit;

a synchronizing signal generating circuit which provides horizontal and vertical synchronizing pulses to a deflecting circuit included in the display in phase with the second clock signal provided by the second PLL circuit; and a timing control circuit which controls the conversion unit.

11. A display according to claim 10, wherein the conversion unit further includes a signal identifying circuit which provides identification information for identifying the input video signals to the timing control circuit.

12. A display for receiving video signals of a plurality of deflection frequencies, the display comprising a conversion unit, the conversion unit including:

a conversion circuit responsive to a horizontal frequency of an input video signal being below at least one predetermined horizontal frequency within a first horizontal frequency range which converts the input video signal to have a converted horizontal frequency within the first horizontal frequency range; and a supply circuit responsive to the horizontal frequency of the input video signal being within the first horizontal frequency range which directly supplies the input video signal to the output of the conversion unit;

wherein the horizontal frequency of the input video signal is within at least one second horizontal frequency range below the first horizontal frequency range;

wherein the conversion unit further includes a frequency increasing circuit which increases the horizontal frequency of the input video signal to within the first horizontal frequency range by multiplying the horizontal frequency by $2^n$, where n is a positive integer of at least 1; and wherein the maximum horizontal frequency within the first horizontal frequency range is double the minimum horizontal frequency within the first horizontal frequency range.

13. A display according to claim 12, wherein the second horizontal frequency range includes two frequency ranges; and wherein the horizontal frequency of the input video signal is multiplied by 2 when it is within one of the two frequency ranges, and is multiplied by 4 when it is within the other of the two frequency ranges.

14. A display according to claim 12, wherein the conversion unit includes:

an A/D conversion circuit which converts the input video signal into digital signals and outputs the digital signals;

a video memory circuit which stores the output digital signals of the A/D conversion circuit for each vertical scanning interval;

a D/A conversion circuit responsive to the video memory circuit which converts the digital signals stored by the video memory circuit into analog signals and outputs the analog signals;

a video signal switching circuit which selectively outputs the output analog signals of the D/A conversion circuit and the input video signal;

a PLL circuit which provides a clock signal synchronous with a horizontal synchronizing signal for the input video signal to the D/A conversion circuit;

a clock signal generating circuit which provides a clock signal obtained by dividing the clock signal provided by the PLL circuit to the A/D conversion circuit;

a synchronizing signal generating circuit which provides horizontal and vertical synchronizing pulses to a deflecting circuit included in the display in phase with the clock signal provided by the PLL circuit; and a timing control circuit which controls the conversion unit.

15. A display according to claim 14, wherein the conversion unit further includes a signal identifying circuit which provides identification information for identifying the input video signal to the timing control circuit.

16. A display for receiving video signals of a plurality of deflection frequencies, the display comprising a conversion unit, the conversion unit including:

a conversion circuit responsive to a horizontal frequency of an input video signal being below at least one predetermined horizontal frequency within a first horizontal frequency range which converts the input video signal to have a converted horizontal frequency within the first horizontal frequency range;

a supply circuit responsive to the horizontal frequency of the input video signal being within the first horizontal frequency range which directly supplies the input video signal to the output of the conversion unit; and a frequency increasing circuit which increases the horizontal frequency of the input video signal to one predetermined horizontal frequency within the first horizontal frequency range by converting a vertical frequency of the input video signal.

17. A display according to claim 16, wherein the conversion unit further includes a signal identifying circuit which provides identification information for identifying the input video signal.

18. A display for receiving video signals of a plurality of deflection frequencies, the display comprising a conversion unit, the conversion unit including:

a conversion circuit responsive to a horizontal frequency of an input video signal being below at least one predetermined horizontal frequency within a first horizontal frequency range which converts the input video signal to have a converted horizontal frequency within the first horizontal frequency range;

a supply circuit responsive to the horizontal frequency of the input video signal being within the first horizontal frequency range which directly supplies the input video signal to the output of the conversion unit; and a frequency increasing circuit which increases the horizontal frequency and a vertical frequency of the input video signal to one predetermined horizontal frequency and one predetermined vertical frequency by changing a size of a display of the input video signal.

19. A method for displaying video signals of a plurality of deflection frequencies, the method comprising the steps of:

in response to at least one of a horizontal frequency and a vertical frequency of an input video signal being below at least one of at least one predetermined horizontal frequency within a first horizontal frequency range and at least one predetermined vertical frequency within a first vertical frequency range, converting the input video signal to have at least one of a converted horizontal frequency within the first horizontal frequency range and a converted vertical frequency within the first vertical frequency range; and in response to the at least one of the horizontal frequency and the vertical frequency of the input video signal being within at least one of the first horizontal frequency range and the first vertical frequency range, directly supplying the input video signal to an output.

20. A method according to claim 19, wherein the at least one of the horizontal frequency and the vertical frequency of the input video signal is within at least one second horizontal frequency range below the first horizontal frequency range and at least one second vertical frequency range below the first vertical frequency range; and wherein the converting step includes the step of increasing the at least one of the horizontal frequency and the vertical frequency of the input video signal to within at least one of the first horizontal frequency range and the first vertical frequency range by multiplying the at least one of the horizontal frequency and the vertical frequency by $2^n$, where n is a positive integer of at least 1.

21. A method according to claim 20, wherein the at least one of the second horizontal frequency range and the second vertical frequency range include two frequency ranges; and wherein the at least one of the horizontal frequency and the vertical frequency of the input video signal is multiplied by 2 when it is within one of the two frequency ranges, and is multiplied by 4 when it is within the other of the two frequency ranges.

22. A method according to claim 21, wherein the converting step and the supplying step include the steps of:

A/D converting the input video signals into digital signals based on a first clock signal synchronous with a horizontal synchronizing signal for the input video signals and outputting the digital signals;

storing the output digital signals of the A/D converting step for each vertical scanning interval;

in response to the storing step, D/A converting the digital signals stored in the storing step into analog signals based on a second clock signal and outputting the analog signals;

selectively outputting the output analog signals of the D/A converting step and the input video signals; and providing horizontal and vertical synchronizing pulses for controlling deflection in a display in phase with the second clock signal used in the D/A converting step.

23. A method according to claim 22, further comprising the step of providing identification information identifying the input video signals.

24. A method according to claim 20, wherein the converting step and the supplying step include the steps of:

A/D converting the input video signals into digital signals based on a clock signal obtained by dividing a clock signal synchronous with a horizontal synchronizing signal for the input video signal and outputting the digital signals;

storing the output digital signals of the A/D converting step for each vertical scanning interval;

in response to the storing step, D/A converting the digital signals stored in the storing step into analog signals based on the clock signal synchronous with the horizontal synchronizing signal for the input video signal and outputting the analog signals;

selectively outputting the output analog signals of the D/A converting step and the input video signals; and providing horizontal and vertical synchronizing pulses for controlling deflection in a display in phase with the clock signal synchronous with the horizontal synchronizing signal for the input video signal.

25. A method according to claim 24, further comprising the step of providing identification information for identifying the input-video signals.

26. A method according to claim 19, wherein the converting step includes the step of increasing the at least one horizontal frequency of the input video signal to one predetermined horizontal frequency within the first horizontal frequency range.

27. A method according to claim 26, wherein the converting step includes the step of increasing the at least one vertical frequency of the input video signal to one predetermined vertical frequency within the first vertical frequency range.

28. A method according to claim 26, wherein the converting step and the supplying step include the steps of:

A/D converting the input video signals into digital signals based on a first clock signal synchronous with a horizontal synchronizing signal for the input video signals and outputting the digital signals;

storing the output digital signals of the A/D converting step for each vertical scanning interval;

in response to the storing step, D/A converting the digital signals stored in the storing step into analog signals based on a second clock signal and outputting the analog signals;

selectively outputting the output analog signals of the D/A converting step and the input video signals; and providing horizontal and vertical synchronizing pulses for controlling deflection in a display in phase with the second clock signal used in the D/A converting step.

29. A method according to claim 28, further comprising the step of providing identification information for identifying the input video signals.

30. A method for displaying video signals of a plurality of deflection frequencies, the method comprising the steps of:

in response to a horizontal frequency of an input video signal being below at least one predetermined horizontal frequency within a first horizontal frequency range, converting the input video signal to have a converted horizontal frequency within the first horizontal frequency range; and in response to the horizontal frequency of the input video signal being within the first horizontal frequency range, directly supplying the input video signal to an output;

wherein the horizontal frequency of the input video signal is within at least one second horizontal frequency range below the first horizontal frequency range;

wherein the converting step further includes the step of increasing the horizontal frequency of the input video signal to within the first horizontal frequency range by multiplying the horizontal frequency by $2^n$, where n is a positive integer of at least 1; and wherein the maximum horizontal frequency within the first horizontal frequency range is double the minimum horizontal frequency within the first horizontal frequency range.

31. A method according to claim 30, wherein the second horizontal frequency range includes two frequency ranges; and wherein the horizontal frequency of the input video signal is multiplied by 2 when it is within one of the two frequency ranges, and is multiplied by 4 when it is within the other of the two frequency ranges.

32. A method according to claim 30, wherein the converting step and the supplying step include the steps of:

A/D converting the input video signal into digital signals based on a clock signal obtained by dividing a clock signal synchronous with a horizontal synchronizing signal for the input video signal and outputting the digital signals;

storing the output digital signals of the A/D converting step for each vertical scanning interval;

in response to the storing step, D/A converting the digital signals stored in the storing step into analog signals based on the clock signal synchronous with the horizontal synchronizing signal for the input video signal and outputting the analog signals;

selectively outputting the output analog signals of the D/A converting step and the input video signal; and providing horizontal and vertical synchronizing pulses for controlling deflection in a display in phase with the clock signal synchronous with the horizontal synchronizing signal for the input video signal.

33. A method according to claim 32, further comprising the step of providing identification information for identifying the input video signal.

34. A method for displaying video signals of a plurality of deflection frequencies, the method comprising the steps of:

in response to a horizontal frequency of an input video signal being below at least one predetermined horizontal frequency within a first horizontal frequency range, converting the input video signal to have a converted horizontal frequency within the first horizontal frequency range;

in response to the horizontal frequency of the input video signal being within the first horizontal frequency range, directly supplying the input video signal to the output of the conversion unit; and increasing the horizontal frequency of the input video signal to one predetermined horizontal frequency within the first horizontal frequency range by converting a vertical frequency of the input video signal.

35. A method according to claim 34, further comprising the step of providing identification information for identifying the input video signal.

36. A method for displaying video signals of a plurality of deflection frequencies, the method comprising the steps of:

in response to a horizontal frequency of an input video signal being below at least one predetermined horizontal frequency within a first horizontal frequency range, converting the input video signal to have a converted horizontal frequency within the first horizontal frequency range;

in response to the horizontal frequency of the input video signal being within the first horizontal frequency range, directly supplying the input video signal to the output of the conversion unit; and increasing the horizontal frequency and a vertical frequency of the input video signal to one predetermined horizontal frequency and one predetermined vertical frequency by changing a size of a display of the input video signal.

* * * * *